P. SCHAU.
CUSHION TIRE.
APPLICATION FILED JUNE 22, 1910.
1,005,326.
Patented Oct. 10, 1911.
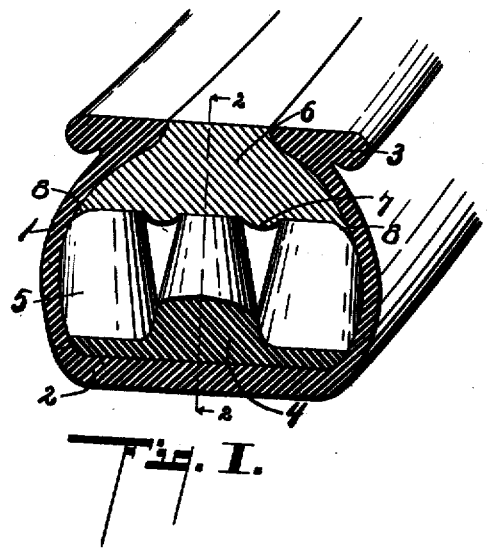
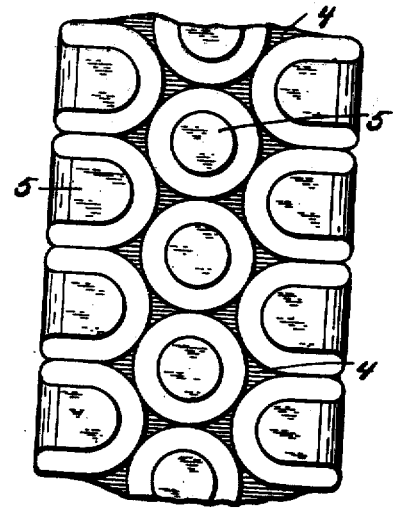
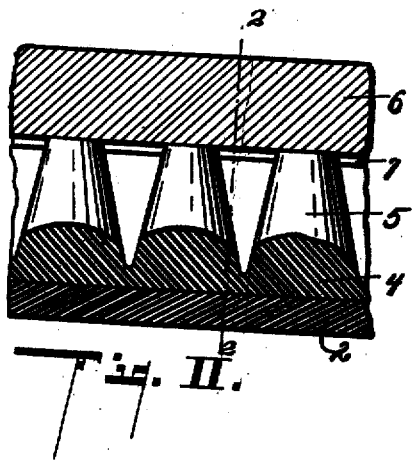
Witnesses
Inventor
Philip Schau
Attorneys ial, although it might be made of wood or hard fiber. The edges of this member 6 are conformed to the outer casing, as illustrated in the drawing, its outer sides being flat to bear against the rim and its inner side being provided with annular ribs 7 disposed between the inner ends of the cones and with flanges 8 at its edges engaging the outer sides of the inner ends of the cones. This assists in supporting the cones in an upright position and retains the parts in their proper relation.

UNITED STATES PATENT OFFICE.

PHILLIP SCHAU, OF KALAMAZOO, MICHIGAN.

CUSHION-TIRE.

1,005,326.   Specification of Letters Patent.   Patented Oct. 10, 1911.

Application filed June 22, 1910. Serial No. 568,357.

*To all whom it may concern:*

Be it known that I, PHILLIP SCHAU, a citizen of the United States, residing at Kalamazoo, Michigan, have invented certain new and useful Improvements in Cushion-Tires, of which the following is a specification.

This invention relates to improvements in cushion tires.

It is particularly an improvement on the structure appearing in Patent No. 557,151, issued to me on March 31st, 1896.

The main objects of this invention are to provide an improved cushion tire which is very resilient and is similar to a pneumatic tire in its action, and one which is simple in structure and very durable and in which the parts are very easily produced and assembled.

A further object is to provide an improved construction of cushion tire which is made up of parts which can be readily assembled for manufacture or for repairs.

Still further objects, and objects relating to structural details, will definitely appear from the detailed description to follow.

I accomplish the objects of my invention by the devices and means described in the following specification.

The structure described constitutes one effective embodiment of my invention. Other embodiments would be readily devised by those skilled in the art.

The invention is clearly defined and pointed out in the claim.

A structure constituting an effective and preferred embodiment of the features of my invention is clearly illustrated in the accompanying drawing, forming a part of this specification, in which:

Figure 1 is a cross section of my improved tire taken on a line corresponding to line 1—1 of Fig. 2. Fig. 2 is a longitudinal section, taken on a line corresponding to line 2—2 of Fig. 1. Fig. 3 is a top plan view of the cushion member. Fig. 4 is a vertical section, through a modified form of cone, the one being hollow.

In the drawing, similar reference characters refer to similar parts throughout the several views, and the sectional views are taken looking in the direction of the little arrows at the ends of the section lines.

Referring to the drawing, the outer separate casing 1 is preferably provided with a flat tread 2 and rim-engaging flanges 3. This casing is very similar to the casing of a pneumatic tire. The casing, as here shown, is formed of rubber. It may be, however, formed of any suitable material.

Within the casing, I arrange a cushion member comprising a band-like case 4, corresponding to the tread of the tire, having a plurality of inwardly-projecting cones 5 thereon, the cones and band being formed integrally of rubber. When there is a plurality of rows, the cones of the adjacent rows are arranged in an alternating or staggered relation, as is clearly illustrated in Fig. 3 of the drawing.

The outer faces or sides of the cones are curved to correspond to the curvature of the sides of the outer casing. Within these cones and corresponding to the rim I arrange an inner member 6, which may be of resilient mater In Fig. 4, I illustrate a hollow cone. Solid cones are, however, preferred. The cones are arranged upon the base or tread band 4, so that their bases are in contact with each other.

By thus arranging the parts, I secure a cushion tire which is very similar to a pneumatic tire in its action, is very resilient and durable. The structure is comparatively economical to produce and can be readily assembled.

I have illustrated and described my improved tire in detail in the form preferred by me, although I am aware that modifications other than those illustrated are possible. I have not, however, attempted to illustrate or describe the same herein as I believe they will be readily understood by those skilled in the art to which my invention relates.

When this structure is considered and compared with the structure of my former patent, it will be seen that this structure can be very readily produced in continuous strips that can be readily conformed to a tire of any dimensions and be effectively vulcanized in that form. The parts can be assembled in such a way that proper tension is put upon the cushion. The cushion cones are retained very effectively in position by the seats prepared for the tips of the same. This makes the structure entirely practicable for heavy work, such as an automobile tire is intended for.

Having thus described my invention, what I claim as new and desire to secure by Letters Patent is:—

A tire comprising a separable outer casing; a cushion member consisting of a band corresponding to the tread, conformed to said casing and having inwardly-projecting cones thereon, the outer sides of the out( cones being conformed to the said casing and an inner member corresponding to tl rim having its edges conformed to the sai outer casing and provided with annul( grooves disposed to seat the inner free poin of said cones.

In witness whereof, I have hereunto s my hand and seal in the presence of tv witnesses.

PHILLIP SCHAU. [L. S.]

Witnesses:
 CLORA ELLYN BRADEN,
 F. GERTRUDE TALLMAN.

Copies of this patent may be obtained for five cents each, by addressing the "Commissioner of Paten Washington, D. C."